UNITED STATES PATENT OFFICE.

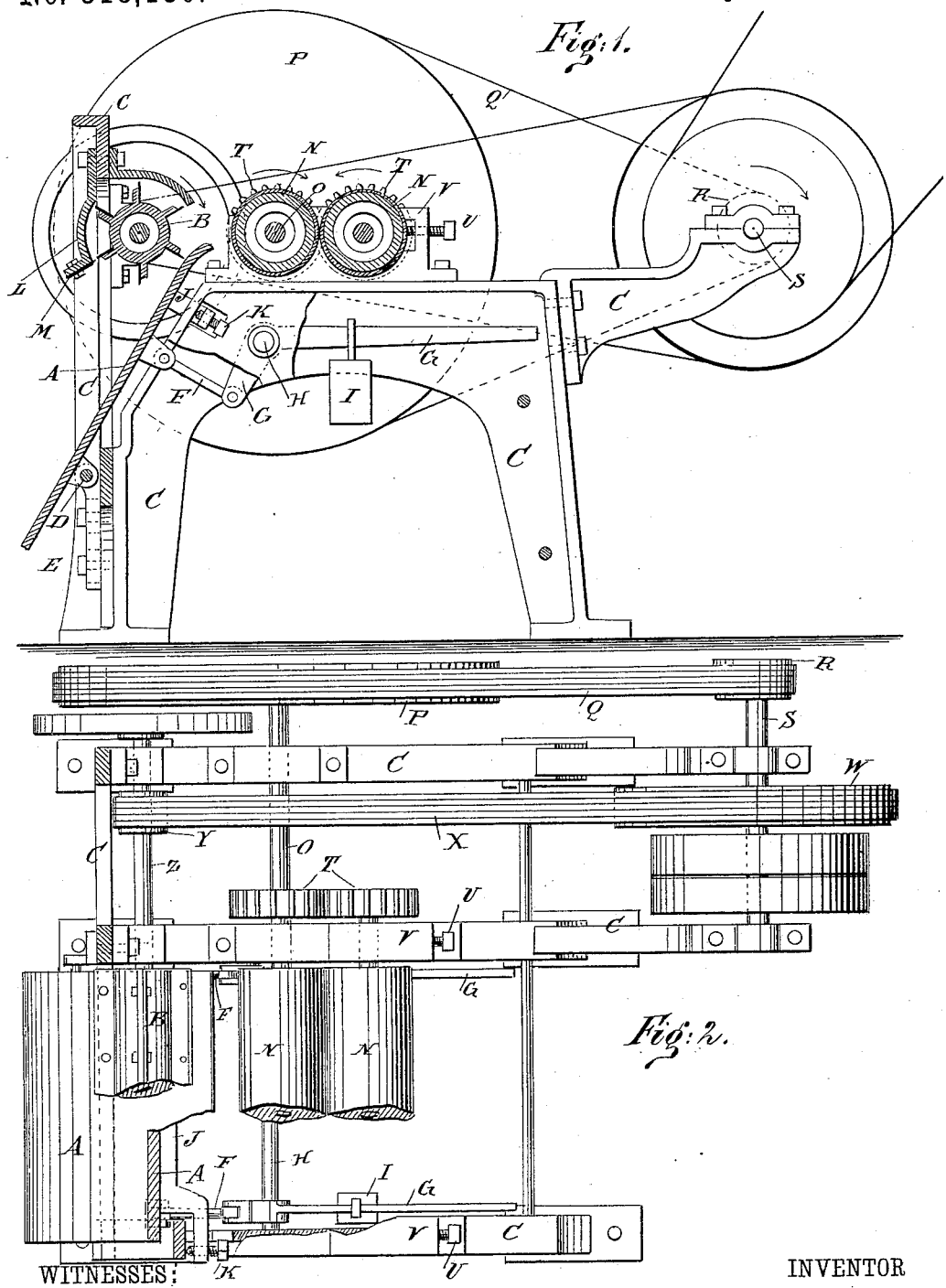

CHARLES NIDA, OF NEW YORK, N. Y.

MACHINE FOR CLEANING INTESTINES.

SPECIFICATION forming part of Letters Patent No. 318,130, dated May 19, 1885.

Application filed July 16, 1884. (No model.)

*To all whom it may concern:*

Be it known that I, CHARLES NIDA, of the city, county, and State of New York, have invented a new and Improved Machine for Cleaning Intestines, of which the following is a full, clear, and exact description.

The object of my invention is to provide a new and improved machine for cleaning intestines, which machine is provided with an inclined automatically-adjusting plane, on which the intestines are cleaned by a rotary scraper-wheel.

The invention consists in the arrangement and combination of parts and details, as will be fully set forth and described hereinafter, and pointed out in the claim.

To fully understand the construction and operation of my machine, I will proceed to give a full and detailed description thereof, reference being had to the accompanying drawings, in which—

Figure 1 is a longitudinal elevation of my improved machine for cleaning intestines, parts being broken out and others shown in section. Fig. 2 is a plan view of the same, parts being broken out.

The intestines are cleaned on a board, table, platform, or inclined plane, A, on which they pass under rotary scraper-wheel B, both mounted on the frame C of the machine. The inclined plane, the upper edge of which is rounded off, is provided with a shaft, D, the ends of which are mounted in journals E in front of frame C. The inclined plane A is connected by connecting-rods F to crank-levers G, mounted on shaft H. The longer ends of the crank-levers G carry movable weights I, by which the pressure of the inclined plane against rotary scraper B can be regulated.

To prevent the scrapers B from scraping or tearing the intestines, the inclined plane A is provided on its back with a cross-bar, J, the ends of which extend through holes in the frame C. In the bent ends of the said bar J set-screws K are held, which rest against the frame C, and by means of which screws the inclined plane can be checked and held any desired distance from the scraper.

To prevent the intestines or the tissue and other matter removed from them by the rotary scrapers from being carried around the scraper-wheel, a shield, L, is attached to the front of frame C, carrying at its lower end a stationary adjustable scraper, M, for clearing the knives of the rotary scraper. A pair of rollers, N, covered with rubber, between which the intestines pass, finishes the cleaning of the interior of the intestines by pressing out the matter contained within them. The first one of the rubber rollers has a long shaft, O, provided at its end with pulley P, connected by belt Q with pulley R on the main shaft S. Both rubber rollers are connected by pinions T, and the pressure between them is regulated by set-screws U on journals V, mounted on frame C. The driving-shaft S also carries a pulley, W, connected by belt X with the pulley Y on shaft Z of the rotary scraper-wheel B.

The operation is as follows: The intestines to be cleaned are passed between the inclined plane A and rotary scraper-wheel B, and the ends of the intestines passed between the two rubber rollers. The rubber rollers pull the intestines in one direction, the rotary scrapers pass the intestines in the opposite direction and remove all flesh, fat, and tissue from the intestines, and thus clean them. The inclined plane is so adjusted that single intestines can just pass between the inclined plane and rotary scraper without being injured. If entire bunches of intestines are fed in between the inclined plane and the scraper they press back the inclined plane, which swings back into its original position when the intestines have passed.

Having thus described my invention, I claim as new and desire to secure by Letters Patent—

In a machine for cleaning intestines, the combination, with a rotary scraper, of a pivoted board adapted to swing toward and from the scraper, the lugs J, projecting from the back of the board, and the screws K, held in the ends of the said lugs and adapted to strike against the frame of the machine and thus limit the vibrating movements of the platform, substantially as herein shown and described.

CHARLES NIDA.

Witnesses:
 C. SEDGWICK,
 F. McARDLE.